Figure 1:
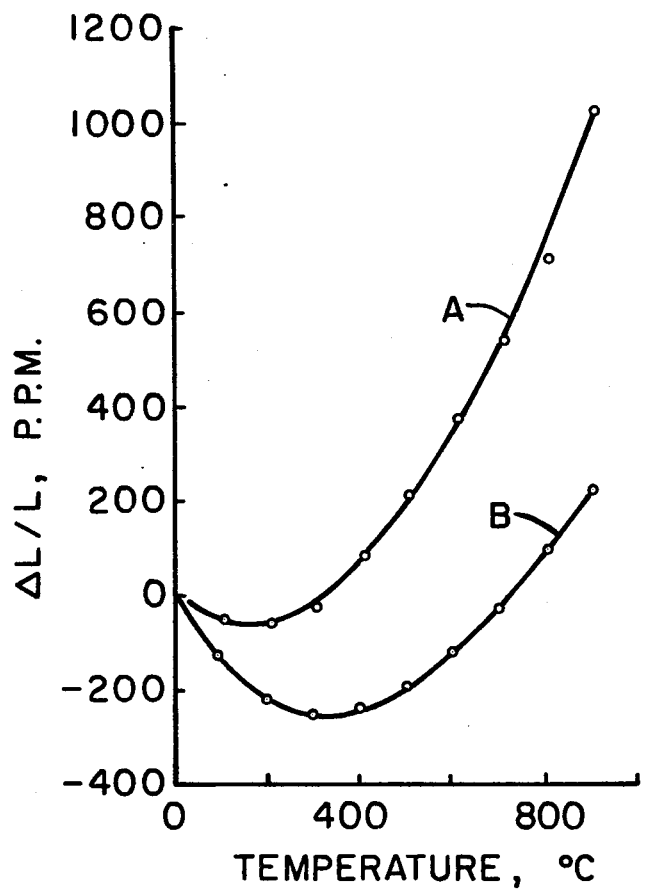

United States Patent
Elmer

[11] 3,958,058
[45] May 18, 1976

[54] ULTRA-LOW EXPANSION CERAMIC ARTICLES

[75] Inventor: Thomas H. Elmer, Corning, N.Y.

[73] Assignee: Corning Glass Works, Corning, N.Y.

[22] Filed: July 29, 1974

[21] Appl. No.: 492,603

[52] U.S. Cl. .................................. 428/220; 65/33; 106/39.6; 106/40 R; 106/48; 252/477 R; 252/450; 428/116; 428/332; 428/338; 156/7; 156/24; 156/25

[51] Int. Cl.² .................. C03C 3/22; B32B 5/00

[58] Field of Search .................. 161/165, 68; 156/7, 156/24, 25; 106/39.6, 40 R, 48 C; 65/31, 30, 33; 252/450, 477 R; 428/116, 220, 332, 338

[56] References Cited
UNITED STATES PATENTS

| | | | |
|---|---|---|---|
| 2,731,355 | 1/1956 | Skinner | 106/62 |
| 2,920,971 | 1/1960 | Stookey | 106/39 |
| 3,061,495 | 10/1962 | Alford | 156/25 |
| 3,112,184 | 11/1963 | Hollenbach | 156/89 |
| 3,113,008 | 12/1963 | Elmer | 156/24 |
| 3,113,855 | 12/1963 | Elmer | 156/24 |
| 3,251,403 | 5/1966 | Smith | 161/68 X |
| 3,498,774 | 3/1970 | Saffadi | 156/24 |
| 3,790,654 | 2/1974 | Bagley | 264/177 R |
| 3,856,706 | 12/1974 | Harrison | 252/450 |

*Primary Examiner*—William J. Van Balen
*Assistant Examiner*—Ellis P. Robinson
*Attorney, Agent, or Firm*—Kees van der Sterre; Clinton S. Janes, Jr.; Clarence R. Patty, Jr.

[57] ABSTRACT

Ultra-low expansion ceramic articles, having average linear coefficients of thermal expansion below about $5.4 \times 10^{-7}/°C$ over the range from room temperature to 1000°C, are produced by removal of MgO and $Al_2O_3$ from cordierite articles by acid leaching to produce ceramic articles having oxide compositions in the range of about 55–75% $SiO_2$, 18–32% $Al_2O_3$, and 7–13% MgO which are characterized by the presence of a major amorphous silica-rich phase.

4 Claims, 2 Drawing Figures

ULTRA-LOW EXPANSION CERAMIC ARTICLES

The present invention has application principally in the manufacture of ceramic bodies useful as heat exchangers, catalyst supports and the like at high temperatures, formed by the chemical treatment of cordierite bodies. Cordierite is a crystalline magnesium aluminum metasilicate ($2MgO.2Al_2O_3.5SiO_2$) which is low in thermal expansion, refractory, and comparatively inert at high temperatures. These properties make cordierite a desirable material for use, for example, as a high temperature catalyst support material in processes such as the catalytic treatment of automotive exhaust gases.

For many of these applications it is desirable that the ceramic body have both high surface area and low resistance to fluid flow. The preferred structure in such cases is a unitary skeletal structure commonly referred to as a honeycomb structure. Such a structure consists essentially of a multiplicity of unobstructed parallel channels of a size permitting gaseous or fluid flow bounded by thin ceramic walls defining the channels. The channels may be of any configuration and dimensions which achieve the desired high skeletal surface area consistent with the free passage of gases therethrough and freedom from plugging by particulate material present in the gas stream. Examples of such preferred structures include the thin-walled ceramic honeycomb structures produced by the method of Bagley as described in U.S. Pat. No. 3,790,654, or by the method of Hollenbach as described in U.S. Pat. No. 3,112,184.

The average bulk coefficient of thermal expansion of dense cordierite over the temperature range of 373°–1173°K has been reported in the literature at values as high as $25.2 \times 10^{116 \ 7}/°C$, although substantially lower values, on the order of about $12 \times 10^{-7}/°C$, have also been recorded. The thermal expansion of cordierite is of interest because ceramic structures needed for high temperature catalyst support or heat exchanger applications should have low thermal expansion in order to exhibit high resistance to deterioration upon repeated thermal cycling. Low thermal expansion insures reduced thermal stress in use and is thus deemed essential for prolonged service life.

It has recently been discovered that some thermal properties of ceramic structures containing cordierite may be improved by treatment with strong mineral acids to selectively remove MgO and $Al_2O_3$ from the cordierite phase. Thus, my U.S. patent application Ser. No. 345,717, filed Mar. 28, 1973 and commonly assigned herewith, describes the treatment of ceramic bodies containing cordierite with mineral acids to improve the thermal shock resistance thereof. The improvement in thermal shock resistance is attributed to the formation, upon the removal of MgO and $Al_2O_3$, of a residual highly siliceous phase exhibiting improved strain tolerance which improves the thermal shock resistance of the bulk ceramic material. Decreases in thermal expansion were also observed upon acidtreatment of cordierite-containing bodies, but these were thought to be limited, and extensive leaching for this purpose was deemed undesirable because of the deleterious effect on body strength resulting therefrom.

I have now found that ultra-low expansion ceramic articles, exhibiting bulk linear coefficients of thermal expansion even lower than that of fused silica, can be produced by acid-treating cordierite ceramic articles of specific composition, configuration, and microstructure to selectively remove $Al_2O_3$ and MgO therefrom. These ceramic articles have oxide compositions, in weight percent, of about 55–75% $SiO_2$, 8–32% $Al_2O_3$, and 7–13% MgO, and are characterized by the presence of a major phase composed predominantly of amorphous silica, which phase exhibits an amorphous halo when examined by X-ray diffraction techniques. This halo is characteristic of an amorphous (noncrystalline) silica; yet ceramic articles produced according to the invention exhibit average linear coefficients of thermal expansion over the range from room temperature to 1000°C. (RT-1000°C) substantially below $5.4 \times 10^{-7}/°C$, which is the value commonly reported for fused (amorphous) silica. These low coefficients are quite surprising in view of the siliceous nature of the major phase, and, moreover, represent unusually low expansions for ceramic materials.

The production of ultra-low expansion ceramic articles according to the invention requires careful selection of the cordierite ceramic articles to be treated. The article must be a thin-walled article in order to effectively be leached by acid in a reasonable time, and it must be highly crystalline in order to achieve the desired low levels of thermal expansion. Thus the article should have a composition consisting essentially of crystalline cordierite and sustantially free of glassy phases.

Articles such as described may be successfully treated to produce low expansion articles by leaching with aqueous solutions of strong mineral acids such as HCl, $HNO_3$ or $H_2SO_4$. Aqueous solutions of other, weaker, acids such as formic acid or acetic acid may alternatively be employed to selectively remove MgO and $Al_2O_3$ from these structures, but the removal process is substantially slower and offers no particular advantage.

The time of acid treatment varies depending on the acid strength employed and on the physical configuration and microstructure of the article treated, but is normally in the range of about ¼–8 hours. Substantial material weight losses due to MgO and $Al_2O_3$ removal and reductions in thermal expansion are generally observed in the cordierite article after about 1 hour in 1.5 Normal nitric acid. Reductions in thermal expansion are observed with continued leaching until a clearly defined minimum expansion value is reached, typically within about 4 hours. Thereafter, further weight losses are observed but the thermal expansion of the leached material begins to increase.

Electron micrographs of cordierite materials at various stages of treatment indicate that acidic attack of the cordierite structure commences at cordierite grain boundaries and that the general shapes of the cordierite crystallites in the material are not altered on leaching. This indicates that the leaching process is topotaxial. However, prolonged leaching produces silica gel deposits which eventually obscure grain boundaries.

The reasons for the very low coefficients of expansion observed in ceramic materials produced according to the invention are not presently understood. However based on the above observations and on the fact that the leached material exhibits substantially increased porosity, it is thought that the low expansion values may be partly attributable to microcracks or voids in the leached material which provide room for the expansion of residual amorphous and crystalline phases. The fact that the decreasing thermal expansions measured in these materials reach a minimum and then increase with prolonged leaching could then be accounted for by the observed redeposition of silica gel in the microcracked or porous regions of the structure.

FIG. 1 of the drawing graphically illustrates the change in linear thermal expansion which occurs on leaching a highly-crystalline ceramic article of nearstoichiometric cordierite composition for 3 hours in 1.5 Normal $HNO_3$ at 95°C. The vertical scale of the graph delineates the changes in length per unit length of the structures tested in parts per million, while the horizontal scale shows the temperatures at which the lengths of the samples were measured.

Curve A is a cooling curve obtained by cooling an unleached ceramic structure from 900°C to room temperature, and corresponds to an extrapolated average linear coefficient of thermal expansion (RT-1000°C) of about $11.4 \times 10^{-7}/°C$.

Curve B is a cooling curve obtained by similar testing of a ceramic structure which was originally of a composition and microstructure identical to the unleached structure of Curve A, but which was exposed to 1.5 Normal $HNO_3$ for 3 hours at 95°C prior to testing. The extrapolated average linear coefficient of thermal expansion (RT-1000°C) of the leached structure obtained by calculation from Curve B is about $3.4 \times 10^{-7}/°C$.

Figure 2:
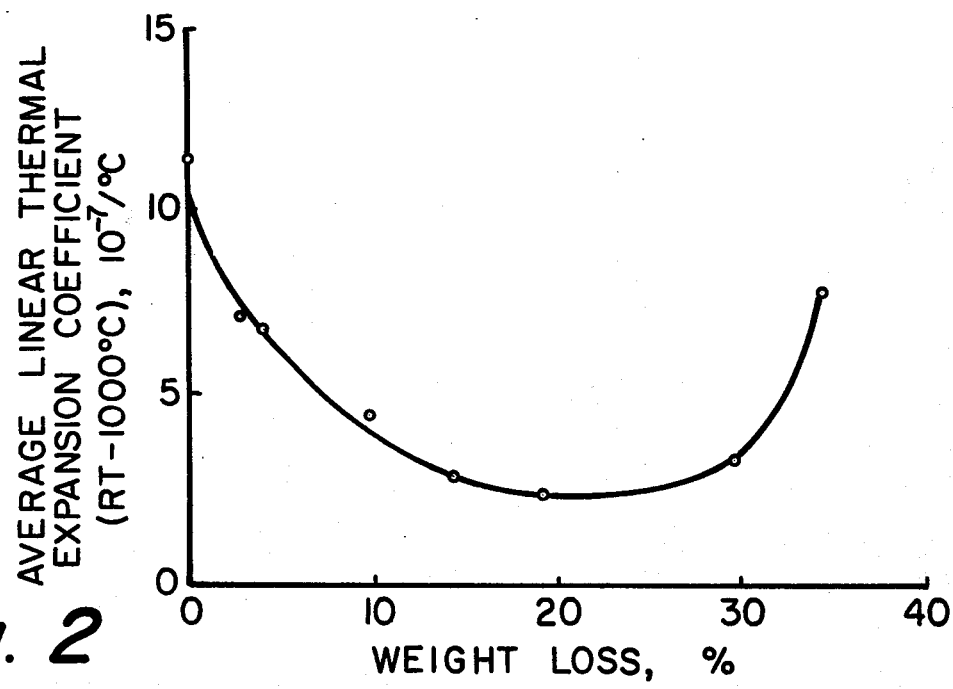

FIG. 2 of the drawing is a plot of the linear coefficient of thermal expansion of a highly crystalline ceramic structure of near-stoichiometric cordierite composition as a function of the weight loss incurred by the structure resulting from leaching in nitric acid. The vertical scale defines the average linear coefficient of thermal expansion of the structure (RT-1000°C) and the horizontal scale defines the material weight loss associated with the observed expansion coefficient, this weight loss being attributable to the removal of MgO and $Al_2O_3$ from the cordierite material in a molar ratio of about 1:1. Ultra-low expansion ceramic articles, having average linear coefficients of thermal expansion (RT-1000°C) below about $5.4 \times 10^{-7}/°C$ result upon the loss through leaching of about 7–32% of the initial weight of the treated cordierite structure as extracted MgO and $Al_2O_3$.

As previously noted, the successful production of ultra-low expansion ceramic articles according to the present invention requires the utilization as a starting material of thin-walled ceramic structures composed essentially completely of cordierite.

By thin-walled ceramic structure is meant a ceramic structure defined by ceramic walls not exceeding about 0.050 inches in thickness, typically in the range of 0.002—0.050 inches in thickness. The preferred structure is a honeycomb structure wherein these thin ceramic walls define passages which readily permit free gaseous flow. Walls of the defined thickness permit rapid penetration of acid leaching solutions and relatively uniform removal of constituents across the wall thickness so that an article of uniform composition and properties is produced.

The selected starting structure should also be one which consists essentially of crystalline cordierite. Such a structure has an oxide composition near stoichiometric cordierite (about 51% $SiO_2$, 35% $Al_2O_3$ and 14% MgO by weight), and comprises a very highly developed cordierite phase such that X-ray diffraction examination of the crystalline material shows cordierite as the single identifiable crystal phase. Cordierite should comprise at least 95% by weight of the ceramic material making up the structure, and the ceramic material should contain at most only minor amounts (not more than about 5% total by weight) of unreacted constituents such as MgO, $Al_2O_3$ or $SiO_2$, impurities such as $Fe_2O_3$, $Li_2O$, $Na_2O$, $K_2O$ or CaO, and secondary crystal phases such as spinel ($MgAl_2O_4$) and aluminum titanate ($Al_2O_3 \cdot TiO_2$).

Finally the selected starting structure must be one which is substantially free of glassy phases. The art is aware that glasses stoichiometric of cordierite or having other compositions in the $MgO-Al_2O_3-SiO_2$ system can form on firing cordierite bodies at high temperatures. The presence or absence of such phases can be ascertained by microscopic examination of the cordierite material according to conventional optical techniques, and a rough quantitative estimate of the amount of glassy phases present can be made. A cordierite material which is not substantially free of glassy phases cannot be successfully treated according to the invention because the glassy phases present in such a material are relatively high in thermal expansion with respect to the cordierite phase and, moreover, are not readily removed from the material by leaching. Thus materials containing glassy phases do not yield ceramic articles having ultra-low coefficients of thermal expansion according to the invention. The preferred structure contains no microscopically-identifiable glass.

The importance of selecting only highly crystalline cordierite structures as starting materials is illustrated by expansion measurements taken on leached and unleached structues of essentially equivalent composition and configuration but differing degrees of crystallinity. The approximate compositions of two such structures, in percent by weight, are set forth below:

| Structure A | Structure B |
| --- | --- |
| 51.4% $SiO_2$ | 49.4% $SiO_2$ |
| 34.8% $Al_2O_3$ | 35.9% $Al_2O_3$ |
| 13.8% MgO | 14.7% MgO |

Structure A, having a bulk coefficient of thermal expansion (RT-1000°C) of about $25 \times 10^{-7}/°C$, contained an amorphous (glassy) phase which was readily detectable by microscopic examination, roughly estimated to comprise about 10% by volume of the ceramic material. Structure B, having a bulk coefficient of thermal expansion (RT-1000°C) of about $12 \times 10^{-7}/°C$, had no visible amorphous phases as evidenced by microscopic examination. Both structures contained cordierite as the predominant crystalline phase, from which MgO and $Al_2O_3$ could be removed by acid leaching. After 6 hours of exposure to 1.5 Normal $HNO_3$ at 95°C, Structure A exhibited an average linear coefficient of thermal expansion (RT-1000°C) of $20.5 \times 10^{-7}/°C$, whereas Structure B exhibited an average linear coefficient of thermal expansion (RT-1000°C) of $3.4 \times 10^{-7}/°C$.

Treatment of the selected starting structure with acid solutions to provide an ultra-low expansion ceramic material is preferably accomplished by immersion of the structure into the selected aqueous solution for a period of time sufficient to reduce the bulk average linear coefficient of thermal expansion of the treated structure below about $5.4 \times 10^{-7}/°C$ over the range from room temperature to 1000°C. By bulk thermal expansion is meant the thermal expansion of the treated structure as a whole as determined by direct measurement on the structure or a portion thereof, rather than the expansion of constituent amorphous or crystalline phases making up the bulk material.

The time required to achieve this reduced level of expansion varies depending upon the configuration and microstructure of the starting article and the strength of the acid medium employed, and is therefore best determined by routine experiment. However, as shown in FIG. 2 of the drawings, good correlation is observed between the weight losses caused by MgO and $Al_2O_3$ extraction during acid leaching and the average bulk coefficients of expansion of the leached materials. Thus leaching for a time sufficient to obtain weight losses ranging between about 7–32% of the starting weight normally produce ultra-low expansion ceramic articles having bulk expansions lower than about $5.4 \times 10^{-7}/°C$.

Preferred acidic solutions are solutions of strong mineral acids (e.g., $HNO_3$, $H_2SO_4$, HCl) having concentrations in the range of about 1–5 Normal. More concentrated acid solutions appear to be less effective for treating these structures, probably because of reduced water activity. Increased concentrations of magnesium and aluminum salts produced by the leaching process in the acid solution appear to reduce the rate of reaction, whereas raising the temperature of the solution increases the reaction rate. Using fresh, hot (95°C) acid solutions of at least 1 Normal concentration, immersion treatments of ¼–8 hours duration are generally sufficient to obtain the desired weight losses and thus ultra-low expansion in the treated cordierite structures.

Following acid treatment of the structure, it is desirable to remove residual leaching solution prior to use, and this may conveniently be accomplished by washing the leached article in dilute acidic solutions (e.g., 0.15 Normal $HNO_3$) followed by rinsing in distilled water. The article may then be dried to remove mechanically-held water, if desired. Heating at 150°C for at least about 1 hour is suitable for this purpose.

The invention may be further understood by reference to the following detailed examples. Example I represents the presently preferred method for producing ultra-low thermal expansion ceramic articles according to the invention.

EXAMPLE I

A series of eight samples is prepared by cutting ⅝ × ⅝ × 3 inch sections from a cordierite honeycomb structure having an approximate analyzed composition, in weight percent, of about 49.2% $SiO_2$, 36.0% $Al_2O_3$, 14.5% MgO, and the remainder impurity levels (less than 1%) of $Fe_2O_3$, $TiO_2$, $Li_2O$, $Na_2O$, $K_2O$ and CaO. The honeycomb structure was formed by extrusion of a plasticized batch material containing alumina, talc and clay to form a circular cylindrical honeycomb comprising about 200 square channels per square inch of cross-sectional area bounded by channel walls about 0.010 inches in thickness. This honeycomb structure was then fired at a temperature sufficient to react the clay, talc and alumina batch materials to form cordierite. The resulting thin-walled crystalline ceramic structure was essentially completely composed of cordierite as evidenced by X-ray diffraction examination, and was substantially free of glassy phases as evidenced by microscopic examination of a polished section of the material.

Seven of the eight samples prepared as described were weighed and then acid-treated by immersion for various lengths of time in fresh 1.5 Normal $HNO_3$ at 95°C. Immersion times ranged from 0.5–7.75 hours. Following exposure to this treatment, the samples were removed from the acid, washed for 10 minutes in dilute 0.15 Normal $HNO_3$ to remove residual leaching solution, and then rinsed in distilled water for 10 minutes at 95°C to remove residual dilute acid. Finally the leached samples were dried for 16 hours at 150°C in an electric drying oven and reweighed.

All eight of the samples were then tested to determine the average linear coefficient of thermal expansion thereof over the temperature range from room temperature to 1000°C. The results of these thermal expansion tests are set forth below in Table I, including the sample number, the time of exposure of each sample to the acidic leaching solution, the weight loss of each sample resulting from acid treatment, and the average linear coefficient of expansion of each sample over the recited range of temperatures, expressed as a length change per unit length per degree Centigrade.

TABLE I

| Sample No. | Leach Time (hours) | Weight Loss (%) | Average Linear Thermal Expansion Coefficient (RT-1000°C) ($\times 10^{-7}/°C$) |
| --- | --- | --- | --- |
| 1 | 0 | 0 | 11.3 |
| 2 | 0.5 | 2.59 | 7.2 |
| 3 | 1 | 4.16 | 6.9 |
| 4 | 2 | 9.78 | 4.5 |
| 5 | 3 | 14.37 | 2.9 |
| 6 | 4 | 19.2 | 2.4 |
| 7 | 6 | 29.6 | 3.4 |
| 8 | 7.75 | 34.3 | 7.9 |

Except for the expansion values shown for the 6 hour and 7.75 hour treatments set forth above, the reported expansion values for each sample are the average of the expansion value computed from a heating expansion curve and the expansion value computed from a cooling expansion curve for that sample. The heating and cooling values differ slightly even for the unleached sample but are close for sample weight losses below about 20%. However, as weight losses exceed this value, shrinkage of the leached sample upon initial heating becomes appreciable (on the order of 1%) and therefore only the expansion curves produced on cooling are used in the computation of the expansion values reported for the 6 and 7.75 hour treatments in Table I.

FIG. 1 of the drawing illustrates expansion curves for Sample 1 of Table I (unleached sample) and Sample 5 of Table I (3 hour leached sample), obtained on cooling the samples from 900°C to room temperature. Average linear expansion values as shown in Table I are obtained from curves of this type by extrapolation to 1000°C. The curve for the unleached sample (Curve A) corresponds to an average linear expansion value (RT-1000°C) of about $11.4 \times 10^{-7}/°C$ whereas the curve for the leached sample (Curve B) corresponds to an average linear expansion value (RT-1000°C) of about $3.4 \times 10^{-7}/°C$. From the weight loss of about 14.37% incurred by this sample upon leaching, consisting of MgO and $Al_2O_3$ in a molar ratio of about 1:1, the calculated oxide composition of Sample 5 is about 57.6% $SiO_2$, 30.2% $Al_2O_3$, and 12.2% MgO by weight.

FIG. 2 of the drawing is a graphical representation of the data set forth in Table I showing the average linear thermal expansion values of the samples treated as a function of weight loss during acid treatment. The data indicate that average coefficients of thermal expansion below about 5.4 × $10^{-7}$/°C are obtained at material weight losses in the range of about 7–32% for this material. Since the starting composition of the material is essentially that of cordierite and since the observed weight losses consist of MgO and $Al_2O_3$ in a molar ratio of about 1:1, the calculated oxide compositions of leached materials having these low expansion values fall within the range of about 55–75% $SiO_2$, 8–32% $Al_2O_3$, and 7–13% MgO. Generally, minimum expansion values in cordierite systems are observed at weight losses in the range of 10–20% by weight.

EXAMPLE II

A second series of five samples is prepared by cutting ⅜ × ⅜ × 3 inch sections from a cordierite honeycomb structure composed of a material having an approximate analyzed composition, in weight percent, of about 49.54% $SiO_2$, 35.36% $Al_2O_3$, 14.04% MgO, and the remainder impurity levels (less than 1%) of $Fe_2O_3$, $TiO_2$, $Na_2O$, $K_2O$ and CaO. The honeycomb structure has a configuration and wall dimensions equivalent to those of the structure of Example I.

Four of the five samples are weighed and immersed in 1.5 Normal $HNO_3$ at 95°C for times ranging from 1–8 hours, removed and rinsed in 0.15 Normal $HNO_3$, and subsequently distilled water, and finally dried at 150°C for 16 hours. The leached samples are then reweighed and measured for thermal expansion. The results of leaching treatment on the expansion properties of the samples are set forth in Table II below, including the leaching time, the weight loss observed, and the average linear coefficient of thermal expansion (RT-1000°C) for each sample.

TABLE II

| Sample No. | Leach Time (hours) | Weight Loss (%) | Average Linear Thermal Expansion Coefficient (RT-1000°C) (×$10^{-7}$/°C) |
|---|---|---|---|
| 1 | 0 | 0 | 5.9 |
| 2 | 1 | 2.83 | 2.3 |
| 3 | 2 | 5.47 | 0.5 |
| 4 | 4 | 11.21 | −0.3 |
| 5 | 8 | 21.9 | −1.4 |

The ultra-low expansion characteristics of the leached samples set forth in Examples I and II above have been found to be reasonably stable upon exposure of the samples high temperatures. Although some increases in expansion are observed following heating at 1200°C, due to the conversion of some amorphous silica to cristobalite, no noticeable alterations in expansion values with time were observed upon prolonged exposure to 800°C and 1000°C temperatures. Thus although ultra-low expansion ceramic articles produced according to the invention exhibit only moderate strengths because of structural modifications which occur on leaching, the ultra-low expansions and stable thermal properties obtainable in such articles are characteristics which are extremely useful for catalyst supports, heat exchangers, or other devices to be employed for high temperature and thermal cycling applications.

I claim:

1. An ultra-low expansion ceramic article having an average linear coefficient of thermal expansion (RT-1000°C.) of less than about 5.4 × $10^{-7}$/°C. and an oxide composition, in weight percent, of about 55–75% $SiO_2$, 8–32% $Al_2O_3$, and 7–13% MgO, said article being produced by:
   a. selecting a highly crystalline ceramic article having ceramic walls not exceeding about 0.050 inches in thickness, said article containing at least about 95% by weight of crystalline cordierite and being substantially free of glassy phases, and
   b. contacting said highly crystalline ceramic article with a strong mineral acid to selectively remove $Al_2O_3$ and MgO therefrom for a time sufficient to produce a weight loss of about 7–32% in the highly crystalline ceramic article.

2. An ultra-low expansion ceramic article according to claim 1 wherein the highly crystalline ceramic article is a ceramic honeycomb structure having ceramic walls in the range of 0.002–0.050 inches in thickness.

3. An ultra-low expansion ceramic article according to claim 2 produced by contacting the highly crystalline ceramic article with an aqueous solution of a mineral acid selected from the group consisting of HCl, $H_2SO_4$ and $HNO_3$, said aqueous solution having a concentration in the range of 1 to 5 Normal.

4. An ultra-low expansion ceramic article according to claim 2 produced by contacting the highly crystalline ceramic article with the aqueous solution of a mineral acid for a time in the range of ¼–8 hours.

* * * * *